(12) United States Patent
Peters (10) Patent No.: US 8,271,439 B2
(45) Date of Patent: Sep. 18, 2012

(54) EFFICIENT SYNCHRONISED UPDATES TO A DATA RECORD IN A DATA STORE

(75) Inventor: Matthew Francis Peters, Hants (GB)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 11/829,435

(22) Filed: Jul. 27, 2007

(65) Prior Publication Data

US 2008/0046676 A1 Feb. 21, 2008

(30) Foreign Application Priority Data

Aug. 16, 2006 (GB) .................................. 0616265.5

(51) Int. Cl.
 G06F 7/00 (2006.01)
 G06F 17/00 (2006.01)
(52) U.S. Cl. ...................................................... 707/624
(58) Field of Classification Search .................. 707/610, 707/624
 See application file for complete search history.

(56) References Cited

U.S. PATENT DOCUMENTS

| | | | | |
|---|---|---|---|---|
| 5,706,509 | A * | 1/1998 | Man-Hak Tso | 707/625 |
| 6,330,568 | B1 * | 12/2001 | Boothby et al. | 1/1 |
| 6,472,329 | B1 * | 10/2002 | Goto et al. | 438/712 |
| 6,694,337 | B1 * | 2/2004 | King et al. | 707/623 |
| 7,281,014 | B2 * | 10/2007 | Toner | 707/624 |
| 7,747,566 | B2 * | 6/2010 | Tysowski et al. | 707/610 |
| 7,809,682 | B2 * | 10/2010 | Paterson et al. | 707/625 |
| 2002/0059299 | A1 * | 5/2002 | Spaey | 707/104.1 |
| 2004/0015508 | A1 * | 1/2004 | Anonsen | 707/100 |
| 2006/0080303 | A1 * | 4/2006 | Sargent et al. | 707/3 |
| 2006/0106881 | A1 * | 5/2006 | Leung et al. | 707/200 |
| 2007/0112882 | A1 * | 5/2007 | Tysowski et al. | 707/201 |
| 2007/0118709 | A1 * | 5/2007 | Tysowski et al. | 711/165 |
| 2007/0198602 | A1 * | 8/2007 | Ngo et al. | 707/201 |

* cited by examiner

Primary Examiner — Robert Beausoliel, Jr.
Assistant Examiner — Susan F Rayyan
(74) Attorney, Agent, or Firm — Steven M. Greenberg, Esq.; Carey, Rodriguez, Greenberg & O'Keefe (57) ABSTRACT

A method for providing synchronized updates to a data record in a data store, the data record including a plurality of data fields, each of the plurality of data fields having an initial field value, the method includes reading the data record from the data store into a data record in memory, each of the plurality of data fields of the data record in the data store having a corresponding data field in the data record in memory, the data fields in the data record in memory having inspectable and modifiable field values; identifying a set of relevant fields comprising at least one of an inspected field and a modified field of the data record in memory; in response to a determination that fields of the data record in the data store corresponding to each of the fields in the set of relevant fields has a value of its initial field value, updating the data record in the data store with the value of modified fields in the data record in memory.

12 Claims, 6 Drawing Sheets

EFFICIENT SYNCHRONISED UPDATES TO A DATA RECORD IN A DATA STORE

BACKGROUND OF THE INVENTION

1. Field of the Invention

The present invention relates to updating a data record in a data store. In particular it relates to synchronized updates to a data record by multiple updaters.

2. Technical Background

Figure 1:
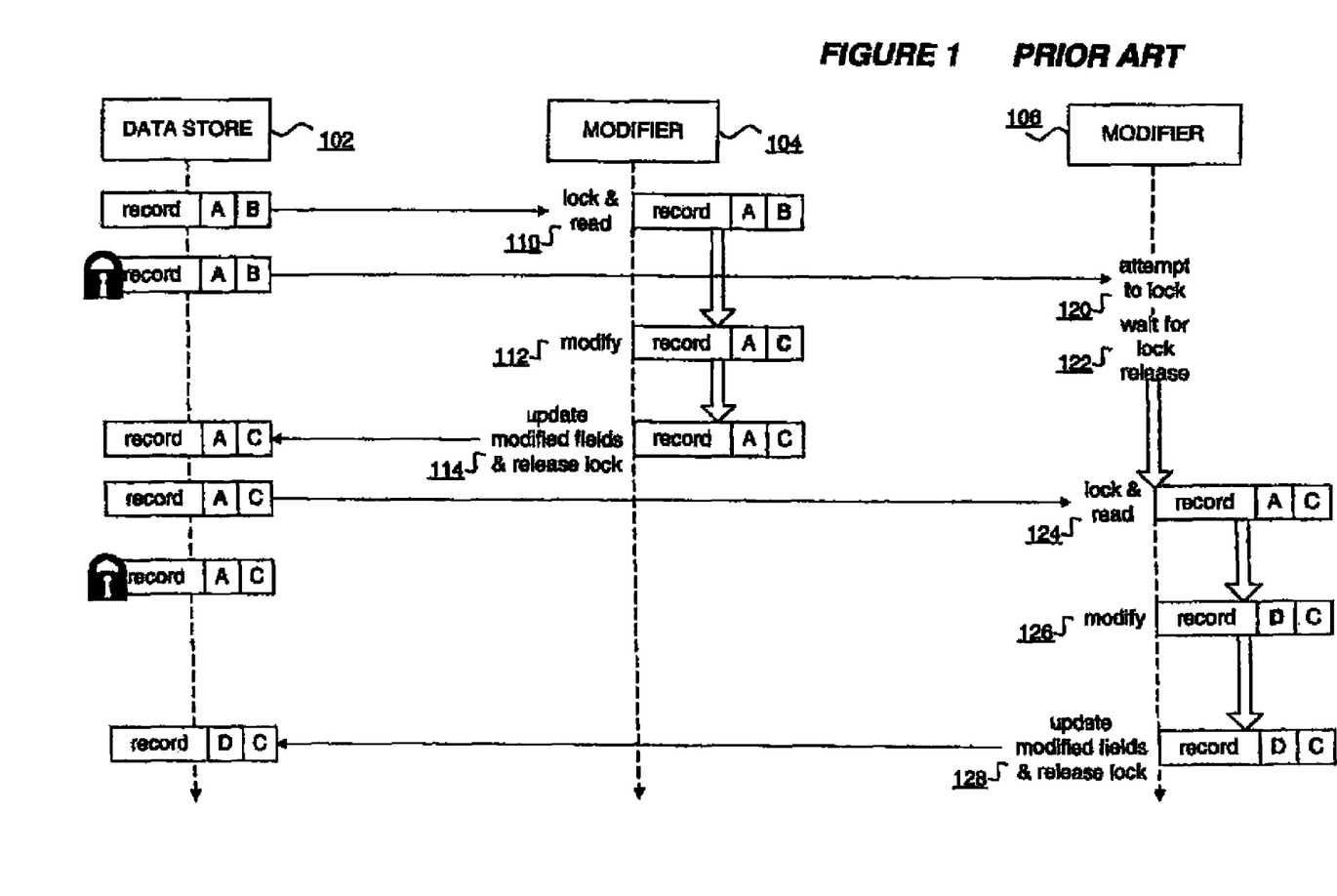
FIG. 1 illustrates a locking technique for synchronizing updates to data records in a data store in the prior art.

Synchronization of updates to data in a data store where there are multiple possible updaters of such data is essential to ensure updates to data are not lost or overwritten. For example, data records including data fields can be stored in a database accessible to multiple software applications for update. FIG. 1 illustrates a locking technique for synchronizing updates to data records in a data store 102. The data store includes a record having two fields with initial values of "A" and "B". A first record modifier 104 and second record modifier 106 are operable to read the record from the data store 102. Initially, the first record modifier 104 applies 110 a synchronization lock to the record in the data store 102 and reads 110 a copy of the record into a memory local to first record modifier 104. The synchronization lock can be an indicator or flag which is useful to prevent other modifiers (such as second record modifier 106) from accessing the record in the data store 102 whilst the lock exists for first record modifier 104. In this way, the first record modifier 104 is able to work with the record from the data store 102 without concerns that other record modifiers are manipulating the record in contemporaneously.

As is illustrated in FIG. 1, second record modifier 106 subsequently attempts 120 to lock the record in the data store 102 unsuccessfully. This is because the record is already locked by the first record modifier 104 and so the second record modifier 106 is required to wait 122 for the lock to be released by the first record modifier 104. The first record modifier 104 modifies 112 the copy of the record in memory by changing a value of a field of the record from "B" to "C". First record modifier 104 subsequently updates 114 the fields of the record in the data store 102 to reflect the modifications made to the copy of the record in local memory. Once the required update by first record modifier 104 is complete, the first record modifier 104 releases 114 the lock it has over the record in the data store 102. At this point, the second record modifier 106 is able to lock and read 124 the record from the data store 102 into a memory local to the second record modifier 106. The second record modifier 106 is able to modify 126 a field of the record in local memory and update 128 fields of the record in the data store 102 to reflect the modifications made to the copy of the record in local memory. The second record modifier 106 finally releases the lock 128.

The approach illustrated in FIG. 1 is effective to ensure synchronization of updates to a record in a data store by means of a locking mechanism which excludes modifiers from accessing a data record where those modifiers are not in possession of a lock on the record. However, this approach has substantial drawbacks. In particular, the approach of FIG. 1 prevents all simultaneous access to the data record in the data store 102, requiring modifiers to wait 122 until a lock is released. This is particularly disadvantageous where a modifier requires a relatively lengthy lock on a data record, for example where user interaction is required to undertake the modifications to data fields. Such delays can have an enormous impact on other processing activities awaiting release of the lock.

An alternative approach which addresses some of these concerns is known as the "optimistic offline lock" and is described in some detail in the book "Patterns of Enterprise Application Architecture" (Martin Fowler, 2002). Optimistic offline lock is a design pattern for addressing the problem of controlling updates to a data record in a data store in such a way that changes made by one modifier do not coincide with changes made by another modifier without requiring the locking of data records. A modifier that retrieves a data record from a data store does not lock the data record but instead checks, when it comes to updating the data record in the data store, that the fields in the data store are still as they were when they were first read. Only if the data in the data store is unchanged can an update proceed.

Figure 2:
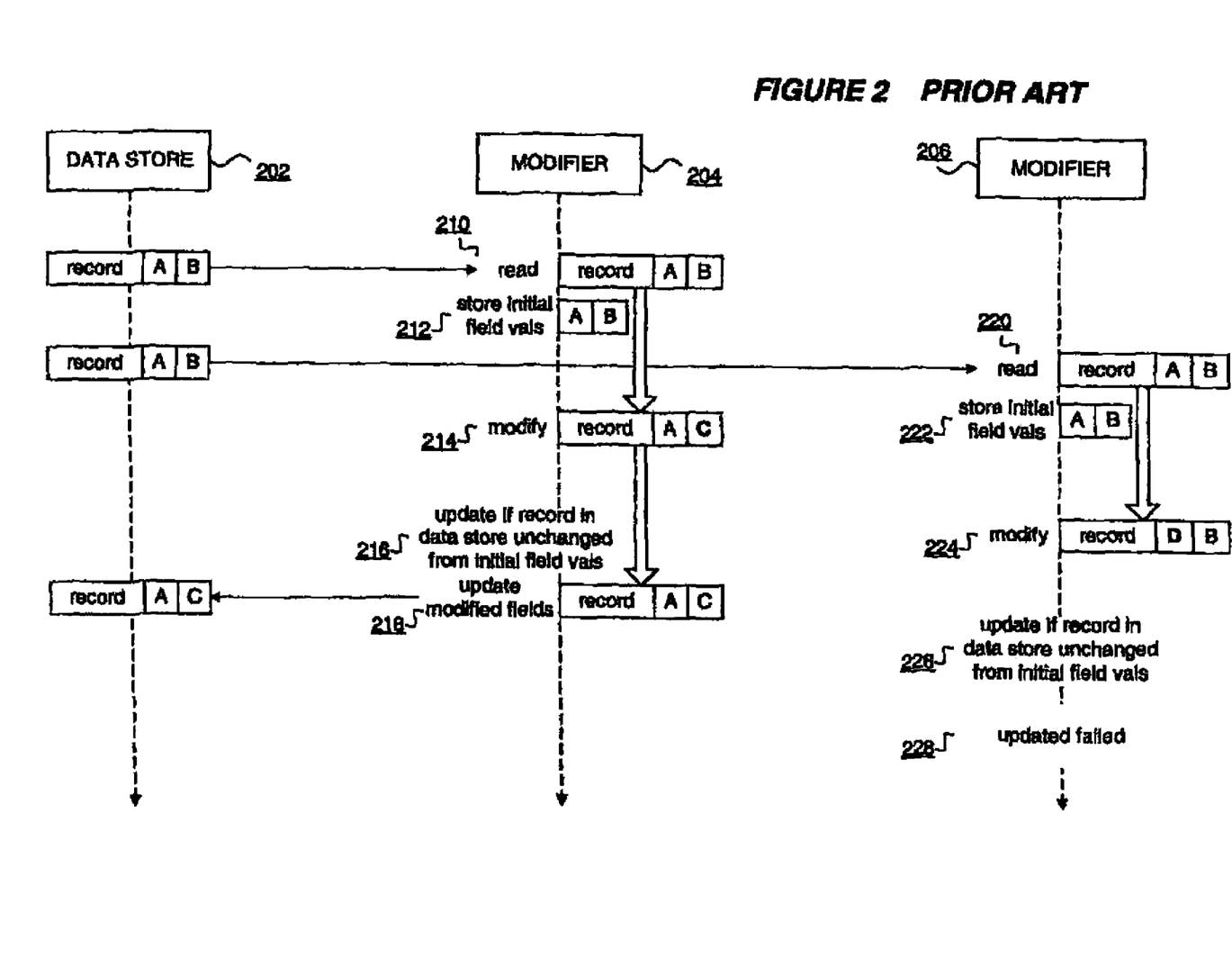
FIG. 2 illustrates an optimistic offline locking technique for synchronizing updates to data records in a data store in the prior art.

FIG. 2 illustrates an optimistic offline locking technique for synchronizing updates to data records in a data store 202. Many of the features of FIG. 2 are identical to those described with respect to FIG. 1 and these shall not be repeated here. Initially, a first modifier 204 reads 210 a data record from a data store 202 into a memory local to the first modifier 204, the data record having two fields with values "A" and "B". These values are stored 212 by the first modifier 204 as initial values of the data record—being the values of the data record at the time the data record was read by the first modifier 204. Subsequently, a second modifier 206 also reads 220 the data record from the data store 202 into a local memory having the same two fields with values "A" and "B". These values are also stored 222 by the second modifier 206 as initial values of the data record—being the values of the data record at the time the data record was read by the second modifier 206. Meanwhile, the first modifier 204 undertakes modifications 214 to a field of the data record in local memory, changing a field value from "8" to "C". The second modifier 206 also undertakes modifications 224 to a field of the data record in memory, changing a field value from "A" to "D".

The first modifier 204 commences an update operation to update the field modified by the first modifier 204 in the data store. The update operation involves the first modifier 204 determining 216 whether the field values of the record in the data store have changed from the initial field values recorded at step 212. Since the record on the data store is unchanged, the first record modifier 204 updates 218 a field in the record in the data store 202 to reflect the modifications made to the copy of the record in memory. The record in the data store now has updated field values of "A" and "C". Subsequently, the second modifier 206 commences an update operation to update the field modified by the second modifier 206 in the data store. The second modifier 206 determines 226 whether the field values of the record in the data store have changed from the initial field values recorded at step 222. The initial field values recorded by the second record modifier 206 at step 222 were "A" and "B" and the record in the data store now has different field values of "A" and "C". These different field values result from a previous update performed by the first modifier 204. Thus, the second modifier 206 determines 228 that there have been parallel updates to the record in the data store and so the update of the second modifier 206 is not able to complete. The second modifier 206 may be required to retry the entire process of reading, modifying and updating until successful.

The approach of FIG. 2 is effective at ensuring synchronized updates to data records in a data store. However, the approach has the disadvantage that updates to disparate fields in a data record by multiple modifiers are prevented even where there is no overlap of updates to the data in the data store. This is clear from the particular example illustrated in FIG. 2 where the second modifier 206 is prevented from applying an update to the data record in the data store 202 even though the first modifier 204 and the second modifier 206 updated disparate fields in the data record.

It would therefore be advantageous to provide for synchronized updates to a data record in a data store by multiple modifiers where there is disparity in the fields of data being updated and inspected by each modifier.

SUMMARY OF THE INVENTION

The present invention accordingly provides, in a first aspect, a method for providing synchronized updates to a data record in a data store, the data record including a plurality of data fields, each of the plurality of data fields having an initial field value, the method comprising the steps of: reading the data record from the data store into a data record in memory, each of the plurality of data fields of the data record in the data store having a corresponding data field in the data record in memory, the data fields in the data record in memory having inspectable and modifiable field values; identifying a set of relevant fields comprising at least one of an inspected field and a modified field of the data record in memory; in response to a determination that fields of the data record in the data store corresponding to each of the fields in the set of relevant fields has a value of its initial field value, updating the data record in the data store with the value of modified fields in the data record in memory.

Thus updates to fields in a record on a data store by a first modifier do not preclude the synchronized updating of the same record by a second modifier where the set of fields updated by the first modifier and the set of fields inspected and updated by the second modifier are disparate. The update of the data record in the data store is not dependent on all fields in the data record in the data store retaining the same values before and after a modification. Instead, only modified and inspected fields are checked for changes. In this way, synchronization is provided where multiple update and inspection affect the same fields whilst multiple updates are provided where update and inspection affect disparate fields.

The present invention accordingly provides, in a second aspect, an apparatus for providing synchronized updates to a data record in a data store, the data record including a plurality of data fields, each of the plurality of data fields having an initial field value, the apparatus comprising: means for reading the data record from the data store into a data record in memory, each of the plurality of data fields of the data record in the data store having a corresponding data field in the data record in memory, the data fields in the data record in memory having inspectable and modifiable field values; means for identifying a set of relevant fields comprising at least one of an inspected field and a modified field of the data record in memory; means for, in response to a determination that fields of the data record in the data store corresponding to each of the fields in the set of relevant fields has a value of its initial field value, updating the data record in the data store with the value of modified fields in the data record in memory.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus described above with respect to the second aspect.

The present invention accordingly provides, in a fourth aspect, a computer program element comprising computer program code to, when loaded into a computer system and executed thereon, cause the computer to perform the steps of a method as described above with respect to the first aspect.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENT

Figure 3:
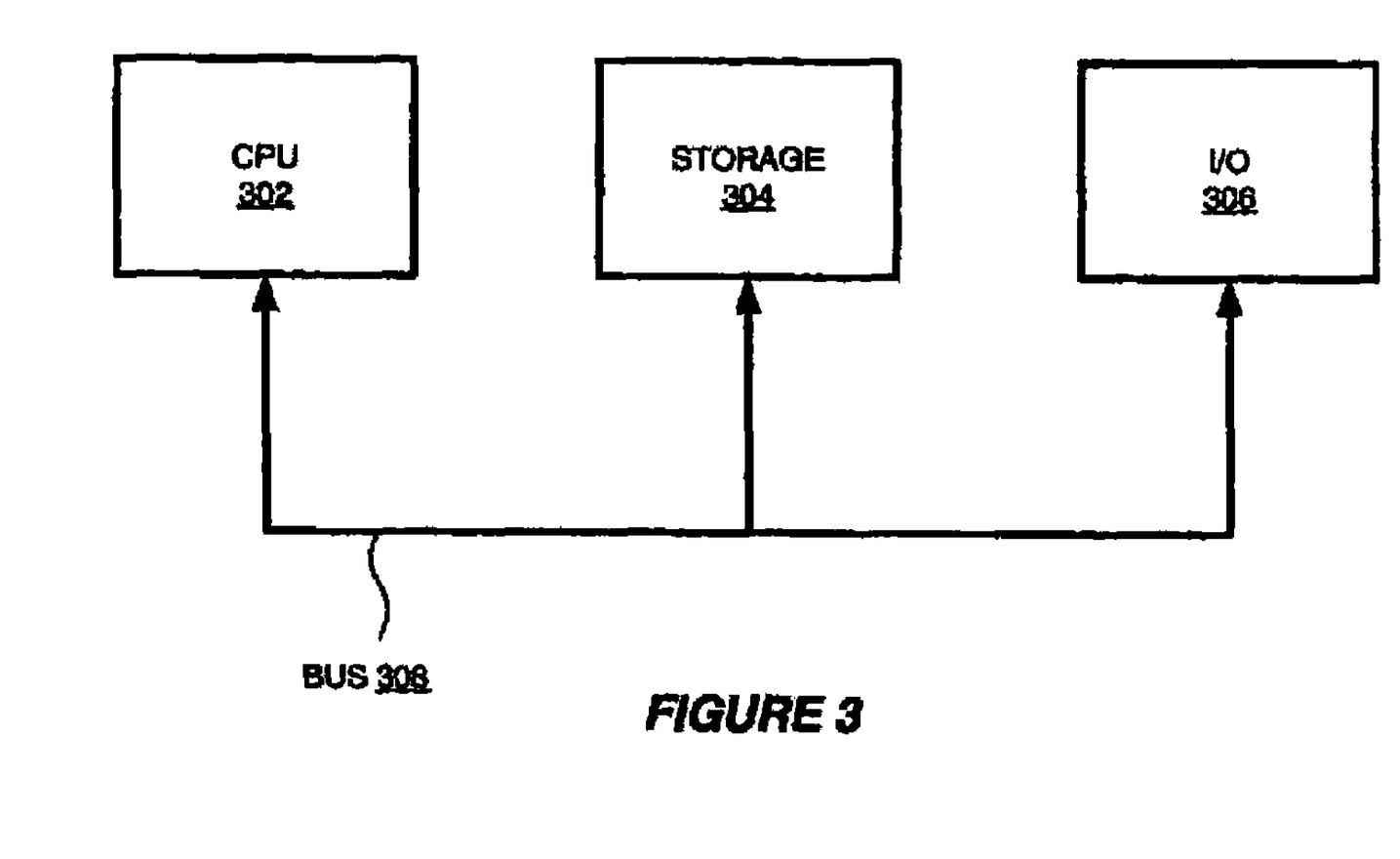
FIG. 3 is a block diagram of a computer system suitable for the operation of embodiments of the present invention.

FIG. 3 is a block diagram of a computer system suitable for the operation of embodiments of the present invention. A central processor unit (CPU) 302 is communicatively connected to a storage 304 and an input/output (I/O) interface 306 via a data bus 308. The storage 304 can be any read/write storage device such as a random access memory (RAM) or a non-volatile storage device. An example of a non-volatile storage device includes a disk or tape storage device. The I/O interface 306 is an interface to devices for the input or output of data, or for both input and output of data. Examples of I/O devices connectable to I/O interface 306 include a keyboard, a mouse, a display (such as a monitor) and a network connection.

Figure 4:
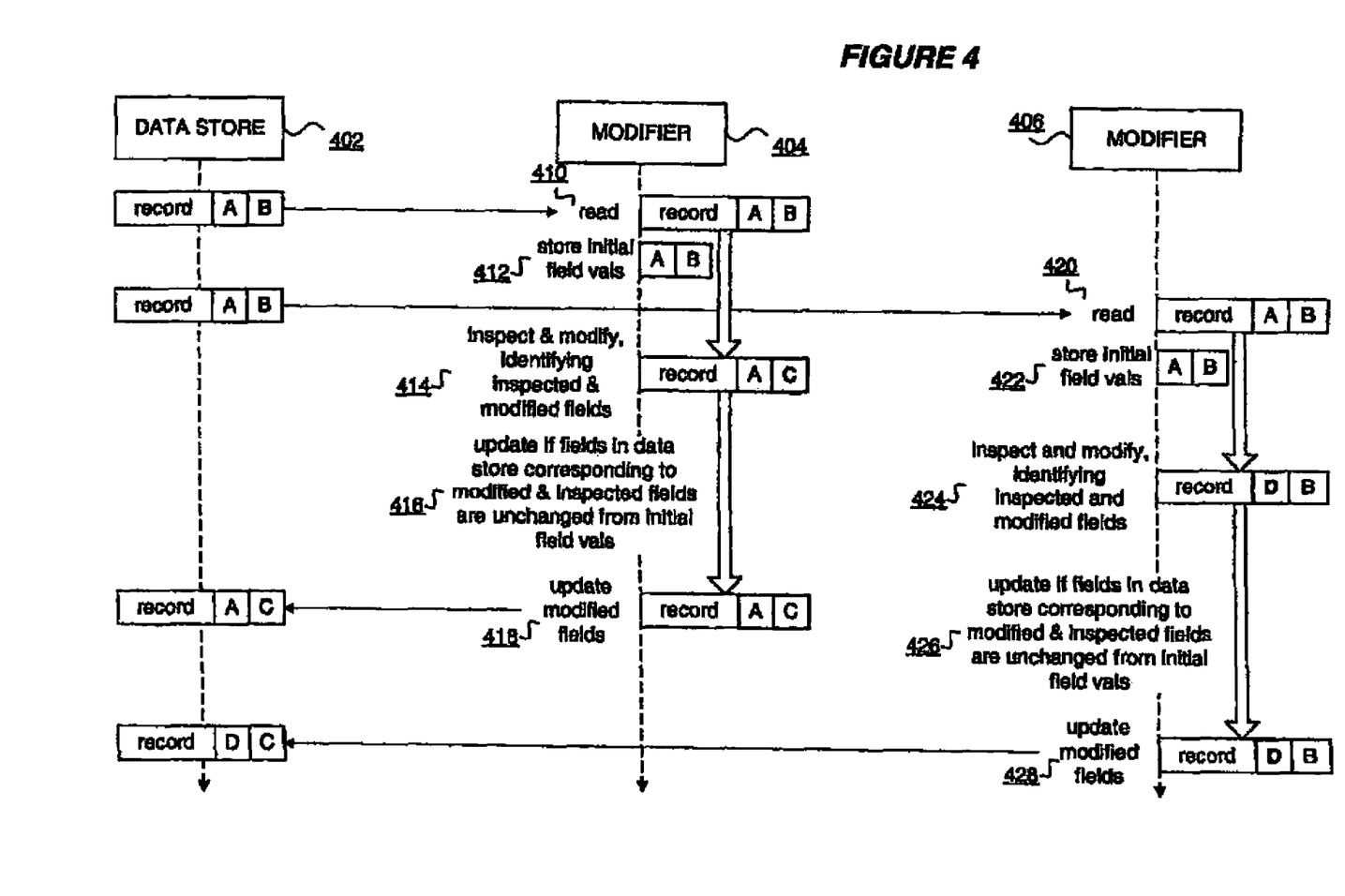
FIG. 4 illustrates a method for providing synchronized updates to a data record in a data store in accordance with a preferred embodiment of the present invention.

FIG. 4 illustrates a method for providing synchronized updates to a data record in a data store 402 in accordance with a preferred embodiment of the present invention. Data store 402 is a means for storing data records such as a database, a data repository, a software routine adapted to provide data records, a hardware storage device having data organized into data records, a document having data organized into records, a spreadsheet or a table of data records. A data record is illustrated as being stored in the data store 402 having data fields. Data fields are individual identifiable elements of data stored within a data record. The data store 402 is illustrated having a single data record with initial field values of "A" and "B".

FIG. 4 further illustrates a first modifier 404 and a second modifier 406. Modifiers 404 and 406 are entities operable to selectively read, inspect and modify data records from the data store 402. Modifiers 404 and 406 read a data record from the data store 402 into a local memory. The local memory for a modifier 404 or 406 is a local storage means such as a random access memory, a volatile or nonvolatile storage device or virtual memory device. The local memory is used by a modifier 404 or 406 as a storage for a copy of a data record read from the data store 402. A copy of the data record stored in local memory includes a copy of all fields of the data record. There is a direct correspondence between fields of the copy of the data record stored in memory and fields of the data record stored in the data store 402. Once the data record is stored in a local memory, a modifier 404 or 406 can inspect and modify data fields within the data record, and subsequently undertake to update the data record stored in the data store 402 with modified field values from the local memory. Notably, only fields in the data record of the data store 402 which have corresponding modifications in a record in local memory of a modifier 404 or 406 are updated. Fields which are not modified by modifiers 404 or 406 are not updated in the record in the data store 402.

The first and second modifiers 404 and 406 are illustrated in FIG. 4 in use in accordance with a preferred embodiment of the present invention. Initially, the first modifier 404 reads 410 the data record from the data store 402 into the local memory of the first modifier 404. The first modifier 404 also stores 412 the initial values of the fields of the data record. The initial values are therefore stored as "A" and "B"—those being the values of the fields of the data record on the data store 402 when the record was read by the first modifier 404. The stored initial values are not modified throughout the processing of the first modifier 404. Subsequently, or potentially contemporaneously, the second modifier 406 reads 420 the data record from the data store 402 into the local memory of the second modifier 406. The second modifier 404 also stores 422 the initial values of the fields of the data records as "A" and "B"—those being the values of the fields of the data record on the data store 402 when the record was read by the second modifier 406. The stored initial values are not modified throughout the processing of the second modifier 405.

Subsequently, the first modifier 404 undertakes to inspect and modify 414 the data record stored in the memory local to first modifier 404. Inspection is the inspection of a value of a field in the data record stored in the memory local to first modifier 404 and can affect any of the fields of the data record which it is necessary for the first modifier 404 to inspect for its purposes. Modifications to the data record stored in the local memory can include, amongst other modifications, the changing, replacing, incrementing, decrementing, revising or recalculating of a value of a field in the data record. The first modifier 404 records an indication of which fields have been inspected or modified in the local memory of the first modifier 404. This is illustrated as a bold box in the record of the first modifier 404 of FIG. 4. Alternatively, the fields inspected or modified in the record in the local memory can be indicated by way of an indicator flag, bit or byte, or the first modifier 404 can maintain a data structure such as a list, table or other record containing references to, or identifiers of, modified fields. Subsequently, or potentially contemporaneously, the second modifier 406 undertakes to inspect and modify 424 the data record stored in the memory local to second modifier 406. The second modifier 404 also records an indication of which fields have been inspected or modified in the local memory of the second modifier 404.

The first modifier 404 determines 416 if the field values corresponding to those fields inspected or modified by the first modifier 404 in the data record on the data store 402 are unchanged from the initial field values stored at step 412. The first modifier 404 has inspected and modified only one field (the field having initial value of "B" has been modified to a value of "C"). A corresponding field in the record on the data store 402 still has the value of "B" and so the first record modifier 404 determines that there have been no changes to this field in the data store 402. The first modifier 404 therefore proceeds to update 418 the record in the data store 402 to reflect the modifications made to this field in the copy of the record in local memory. The record in the data store now has updated field values of "A" and "C".

Subsequently, the second modifier 406 determines 426 if the field values for those fields inspected or modified by the second modifier 406 in the data record of the data store 402 are unchanged from the initial field values stored at step 422. The second modifier 406 has inspected and modified only one field (that having initial value of "A"). This field still has the value of "A" on the data store 402 (this is despite the update by the first modifier 404). There have therefore been no changes to this field in the data store 402. The second modifier is therefore able to proceed to update 428 the record in the data store 402 to reflect the modifications made to this field in the copy of the record in local memory. The record in the data store now has updated field values of "D" and "C".

In this way the second modifier 406 is able to update the data record in the data store 402 despite that data record having been updated by the first modifier 404 at the same time because the inspections and updates affected disparate data fields in the data record on the data store 402. The condition applied to determine whether a modifier is able to apply an update to the data record in the data store 402 requires that only fields corresponding to those inspected or modified by a modifier are checked for changes since the record was read by the modifier. Thus, changes to fields in a record on a data store by a first modifier do not preclude the updating of the same record by a second modifier where the fields updated and inspected by the first and second modifiers are disparate.

Figure 5:
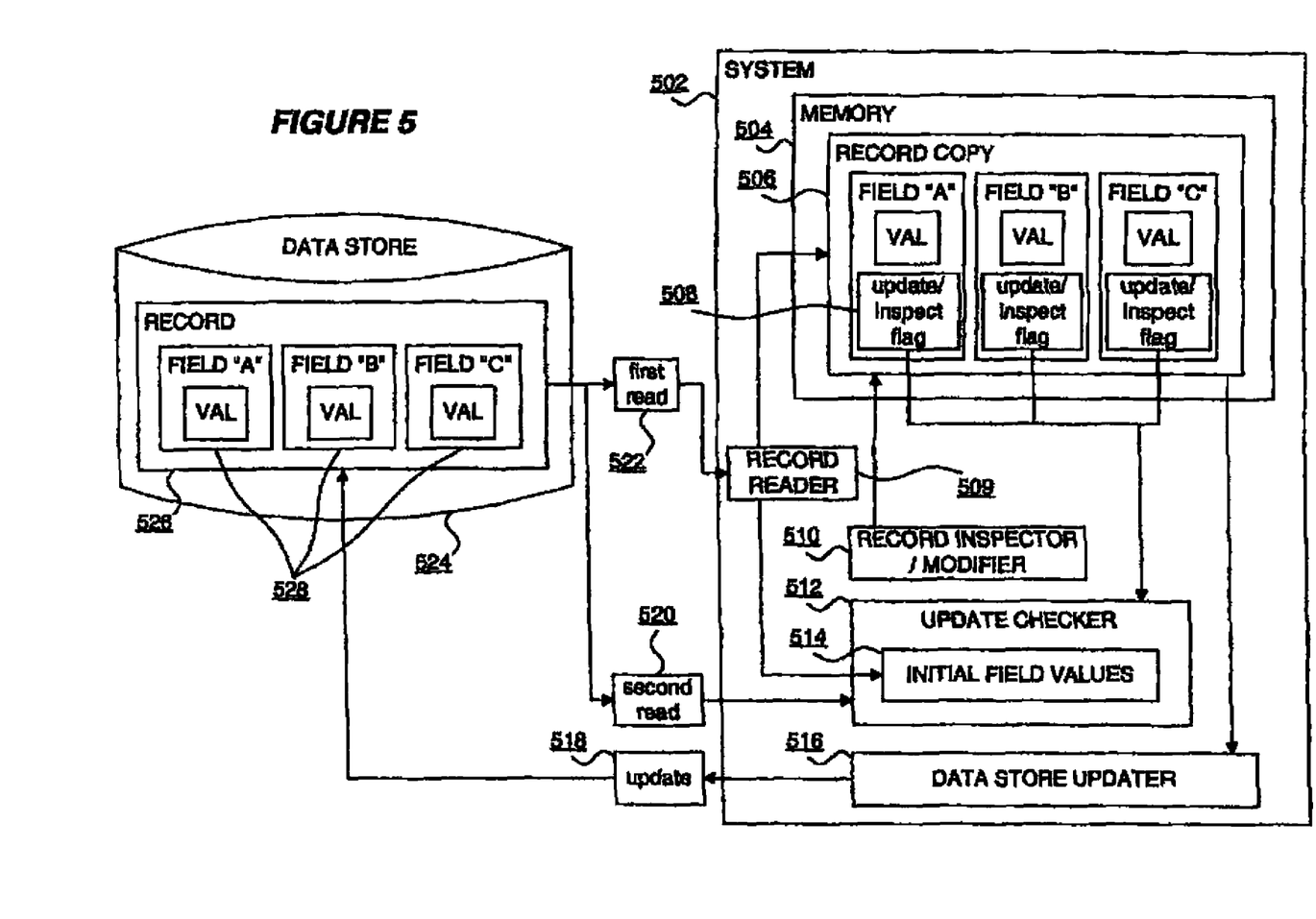
FIG. 5 illustrates a modifier system for making an update to a data record in a data store in accordance with a preferred embodiment of the present invention.

FIG. 5 illustrates a modifier system 502 for making an update 518 to a data record 526 in a data store 524 in accordance with a preferred embodiment of the present invention. The system 502 can be a localized or distributed computer system and is communicatively connected to the data store 524. The connection between the system 502 and the data store 524 can be a wired or wireless network connection, or a local bus connection. Alternatively, the data store 524 can form part of the system 502. Stored on the data store 524 is an exemplary data record 526 having three data fields 528 named as field "A", field "B" and field "C". Each field has associated a data value.

The system 502 includes a local memory 504 and operable elements 509, 510, 512 and 516. The local memory 504 is a storage means which is local to the system 502 such as a random access memory, a volatile or non-volatile storage device or virtual memory device. The operable elements 509, 510, 512 and 516 are hardware or software entities operable to undertake particular functions. A record reader 509 is operable to read the record 526 from the data store 524 and store copies of the record as required. The record reader 509 initially performs a first read 522 of the record 526 and stores a copy of the record 526 in the memory 504 as record copy 506. Record copy 506 includes fields corresponding directly to the fields of the record 526 in the data store 524. The record reader 509 further provides initial field values 514 accessible to an update checker 512 which is described in more detail below.

The system 502 further includes a record inspector/modifier operable component 510 which is operable to inspect and modify values associated with fields in the record copy 506. For example, inspections or modifications may be made by the record inspector/modifier 510 as part of a data update process or a business application. Any field inspected or modified by the record inspector/modifier 510 is identified as such by way of an update/inspect flag 508 stored in the field. The updated/inspect flag 508 can be a single bit or byte, or an additional field in its own right. Alternatively, update/inspect flags 508 can be indicated externally to the fields themselves, or externally to the record copy 506 itself, such as is described above with respect to FIG. 4.

On completion of required modifications to the fields of the record copy 506 by the record inspector/modifier 510, the update checker 512 undertakes a check of the record 526 in the data store 524 to ensure the record 526 can be updated without synchronization problems. The update checker 512 includes initial field values 514 which are the values of the fields 528 of the data record 526 at the time it was read by the record reader 509 prior to inspection or modification by the record inspector/modifier 510. The update checker 512 performs a second read 520 of the data record 526 in the data store 524 and identifies which fields in the record copy were 506 have been inspected or modified by the record inspector/modifier 510 with reference to the update/inspect flags 508. In an alternative embodiment, the update checker 512 can employ the record reader 509 to perform the second read 520. The update checker 512 determines if the fields in the record 526 in the data store 524 corresponding to the identified inspected and modified fields in the record copy 506 have changed from the initial field values 514. If the fields have changed from the initial field values 514 then an update cannot take place as fields for inspection and modification by the record inspector/modifier 510 have been modified in parallel. Alternatively, if the fields have not changed from the initial field values 514, then the update is able to proceed, and the data store updater 516 is operable to undertake the update 518 to the record 526 in the data store 524. The data store updater 516 updates only the fields in the record 526 which are identified as being modified in the record copy 506 by way of the updated flags 508.

FIG. 5 illustrates a single system 502 in communication with the data store 524. It will, however, be appreciated by those skilled in the art that embodiments of the present invention which are directed to providing synchronized updates to the data record 526 in the data store 524 will involve a multiplicity of systems or record modifiers between which synchronization is required. In this regard, FIG. 5 is intended only to illustrate an exemplary form and operation of a single one of such systems.

Figure 6:
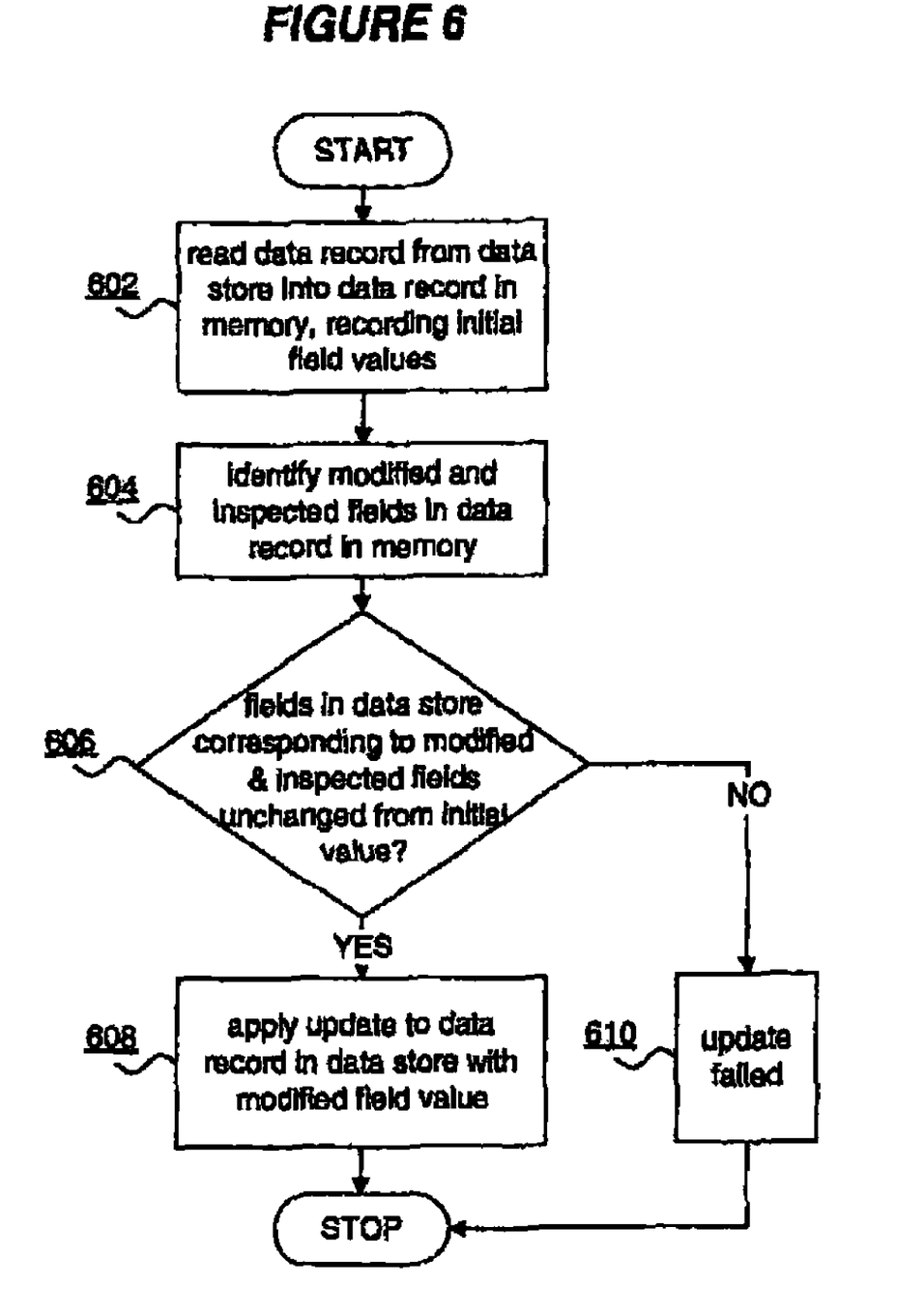
FIG. 6 is a flowchart of a method of the modifier system of FIG. 5 in accordance with a preferred embodiment of the present invention.

FIG. 6 is a flowchart of a method of the modifier system 502 of FIG. 5 in accordance with a preferred embodiment of the present invention. At step 602 the data record 526 is read from the data store 524 and record copy 506 is generated in memory 504 for inspection and modification. Initial field values 514 are stored. At step 604, modified and inspected fields in the record copy 506 are identified and at step 606 the method determines whether the fields in the record 526 in the data store 524 corresponding to reflect the modifications made to the corresponding field in the record copy 506. Alternatively, if the fields in the record 526 are changed from their initial field value, the method determines that an update cannot take place.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

I claim:

1. A method for providing synchronized updates to a data store data record in a data store,
the data store data record including a first data field and a second data field and each of the first and second data fields having an initial field value,
the method comprising:
reading by a first modifier the data store data record from the data store into a local memory of the first modifier and storing by the first modifier the initial values of the first and second data fields of the data store data record into corresponding first and second data fields of a first copy of the data store data record in the local memory of the first modifier;
reading by a second modifier the data store data record from the data store into a local memory of the second modifier and storing by the second modifier the initial values of the first and second data fields of the data store data record into corresponding first and second data fields of a second copy of the data store data record in the local memory of the second modifier;
determining by the first modifier that a value in the second data field of the first copy of the data store data record in the local memory of the first modifier has changed from the initial value to an updated value;
updating the value in the second data field of the data store data record in the data store to the updated value only upon determining that the value in the second data field of the data store data record is unchanged from the initial value;
determining by the second modifier that a value in the first data field of the second copy of the data store data record in the local memory of the second modifier has changed from the initial value to an updated value;
updating the value in the first data field of the data store data record in the data store to the updated value only upon determining that the value in the first data field of the data store data record is unchanged from the initial value.

2. The method of claim 1, wherein
the updating the current field value of the first data field of the data store data record occurs without updating the current field value of the second data field of the data store data record.

3. The method of claim 1, wherein
the data fields of the first copy and the second copy of the data store data record each include an indicator, and the indicator for each data field indicates that the data field has changed from an initial field value of the data field.

4. The method of claim 3, wherein the indicator is a data flag.

5. A computer hardware device for providing synchronized updates to a data store data record in a data store, the data store data record including a first data field and a second data field and each of the first and second data fields having an initial field value, comprising:

at least one processor, wherein the at least one processor configured for reading by a first modifier the data store data record from the data store into a local memory of the first modifier and storing by the first modifier the initial values of the first and second data fields of the data store data record into corresponding first and second data fields of a first copy of the data store data record in the local memory of the first modifier;

reading by a second modifier the data store data record from the data store into a local memory of the second modifier and storing by the second modifier the initial values of the first and second data fields of the data store data record into corresponding first and second data fields of a second copy of the data store data record in the local memory of the second modifier;

determining by the first modifier that a value in the second data field of the first copy of the data store data record in the local memory of the first modifier has changed from the initial value to an updated value;

updating the value in the second data field of the data store data record in the data store to the updated value only upon determining that the value in the second data field of the data store data record is unchanged from the initial value;

determining by the second modifier that a value in the first data field of the second copy of the data store data record in the local memory of the second modifier has changed from the initial value to an updated value;

updating the value in the first data field of the data store data record in the data store to the updated value only upon determining that the value in the first data field of the data store data record is unchanged from the initial value.

6. The computer hardware device of claim 5, wherein the updating the current field value of the first data field of the data store data record occurs without updating the current field value of the second data field of the data store data record.

7. The computer hardware device of claim 5, wherein the data fields of the first copy and the second copy of the data store data record each include an indicator, and the indicator for each data field indicates that the data field has changed from an initial field value of the data field.

8. The computer hardware device of claim 7, wherein the indicator is a data flag.

9. A computer program product comprising a computer-readable storage medium having stored therein computer usable program code for providing synchronized updates to a data store data record in a data store, the data store data record including a first data field and a second data field and each of the first and second data fields having an initial field value, the computer usable program code, which when executed by a computer hardware system, causing the computer hardware system to perform the operations of:

reading by a first modifier the data store data record from the data store into a local memory of the first modifier and storing by the first modifier the initial values of the first and second data fields of the data store data record into corresponding first and second data fields of a first copy of the data store data record in the local memory of the first modifier;

reading by a second modifier the data store data record from the data store into a local memory of the second modifier and storing by the second modifier the initial values of the first and second data fields of the data store data record into corresponding first and second data fields of a second copy of the data store data record in the local memory of the second modifier;

determining by the first modifier that a value in the second data field of the first copy of the data store data record in the local memory of the first modifier has changed from the initial value to an updated value;

updating the value in the second data field of the data store data record in the data store to the updated value only upon determining that the value in the second data field of the data store data record is unchanged from the initial value;

determining by the second modifier that a value in the first data field of the second copy of the data store data record in the local memory of the second modifier has changed from the initial value to an updated value;

updating the value in the first data field of the data store data record in the data store to the updated value only upon determining that the value in the first data field of the data store data record is unchanged from the initial value.

10. The computer program product of claim 9, wherein the updating the current field value of the first data field of the data store data record occurs without updating the current field value of the second data field of the data store data record.

11. The computer program product of claim 9, wherein the data fields of the first copy and the second copy of the data store data record each include an indicator, and the indicator for each data field indicates that the data field has changed from an initial field value of the data field.

12. The computer program product of claim 11, wherein the indicator is a data flag.

* * * * *